United States Patent
Yang et al.

(10) Patent No.: US 9,588,371 B2
(45) Date of Patent: Mar. 7, 2017

(54) FLIPPED PANEL DISPLAYS WITH BLACK COLUMN SPACERS

(71) Applicant: Apple Inc., Cupertino, CA (US)

(72) Inventors: Byung Duk Yang, Cupertino, CA (US); Flora M. Li, Cupertino, CA (US); Kwang Soon Park, Cupertino, CA (US); Ming-Chin Hung, Cupertino, CA (US); Shih-Chang Chang, Cupertino, CA (US); Yong Kwan Kim, Sunnyvale, CA (US); Young Cheol Chang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 29 days.

(21) Appl. No.: 14/497,252

(22) Filed: Sep. 25, 2014

(65) Prior Publication Data

US 2015/0323831 A1     Nov. 12, 2015

Related U.S. Application Data

(60) Provisional application No. 61/989,467, filed on May 6, 2014.

(51) Int. Cl.
| | |
|---|---|
| *G02F 1/1339* | (2006.01) |
| *G02F 1/1335* | (2006.01) |
| *G02F 1/1368* | (2006.01) |
| *G02F 1/1362* | (2006.01) |

(52) U.S. Cl.
CPC ...... *G02F 1/133509* (2013.01); *G02F 1/1368* (2013.01); *G02F 1/13394* (2013.01); *G02F 1/133512* (2013.01); *G02F 1/133516* (2013.01); *G02F 1/136209* (2013.01); *G02F 2001/133519* (2013.01)

(58) Field of Classification Search
CPC ... G02F 1/133514; G02F 2001/136222; G02F 2001/13685; G02F 1/133512; G02F 1/13394; G02F 2001/13398; G02F 1/136209
See application file for complete search history.

(56) References Cited

U.S. PATENT DOCUMENTS

| | | | |
|---|---|---|---|
| 5,850,271 A | * | 12/1998 | Kim ................. G02F 1/133512 349/106 |
| 6,285,424 B1 | | 9/2001 | Yoshida |
| 7,436,472 B2 | | 10/2008 | Baek |

(Continued)

*Primary Examiner* — Kendrick Hsu
(74) *Attorney, Agent, or Firm* — Treyz Law Group, P.C.; Jason Tsai; Zachary D. Hadd

(57) ABSTRACT

A liquid crystal display may have a thin-film transistor layer with an array of pixel electrode structures for applying electric fields to a liquid crystal layer. The liquid crystal display may also have a color filter layer with an array of color filter elements. The color filter elements may allow the display to display color images. The color filter layer may be interposed between the thin-film transistor layer and a backlight. The liquid crystal layer may be sandwiched between the thin-film transistor layer and the color filter layer. The color filter layer may have a transparent substrate on which the color filter elements are formed. Black masking structures may be formed on a transparent overcoat layer that covers the color filter elements. Black column spacers may be formed from the same layer of material that forms the black masking structures.

15 Claims, 8 Drawing Sheets

(56) References Cited

U.S. PATENT DOCUMENTS

| | | | |
|---|---|---|---|
| 7,460,201 B2 | 12/2008 | Ashizawa et al. | |
| 8,377,735 B2* | 2/2013 | Kim | G02F 1/167 |
| | | | 438/82 |
| 2002/0130992 A1* | 9/2002 | Huang | G02F 1/133514 |
| | | | 349/106 |
| 2011/0063538 A1* | 3/2011 | Xie | G02F 1/134309 |
| | | | 349/43 |
| 2013/0077009 A1* | 3/2013 | Asako | G02F 1/1334 |
| | | | 349/42 |
| 2013/0155351 A1* | 6/2013 | Garelli | G02B 6/001 |
| | | | 349/64 |
| 2013/0201429 A1* | 8/2013 | Xu | G02F 1/133512 |
| | | | 349/95 |
| 2013/0265521 A1 | 10/2013 | Chen et al. | |
| 2013/0335657 A1 | 12/2013 | Kira et al. | |

* cited by examiner

FLIPPED PANEL DISPLAYS WITH BLACK COLUMN SPACERS

This application claims the benefit of provisional patent application No. 61/989,467 filed May 6, 2014, which is hereby incorporated by reference herein in its entirety.

BACKGROUND

This relates generally to electronic devices and, more particularly, to electronic devices with displays.

Electronic devices often include displays. For example, cellular telephones and portable computers include displays for presenting information to users.

Displays such as liquid crystal displays may have a thin-film transistor layer that contains thin-film transistor circuitry and pixel electrodes. Liquid crystal displays may also have color filter layers. A color filter layer may have an array of color filter elements of different colors. A layer of liquid crystal material is sandwiched between the thin-film transistor layer and the color filter layer. The thin-film transistor layer is used to apply electric fields to the liquid crystal layer with the pixel electrodes. The color filter layer allows the display to display color images for a user.

To form a satisfactory display, the color filter layer should be aligned with the thin-film transistor layer. Alignment challenges and other issues should be addressed to ensure satisfactory display performance. If care is not taken, a display may be dim or may present images that appear washed out to a user.

It would therefore be desirable to be able to provide improved displays.

SUMMARY

An electronic device may be provided with a display. The display may be a liquid crystal display. The liquid crystal display may have a backlight that provides illumination for the display.

The liquid crystal display may have a thin-film transistor layer with an array of pixel electrode structures for applying electric fields to pixel-sized regions of a liquid crystal layer. The liquid crystal display may also have a color filter layer with an array of color filter elements. The color filter elements may be aligned with the array of pixel electrode structures and may allow the display to display color images. The color filter layer may be interposed between the thin-film transistor layer and the backlight. The liquid crystal layer may be sandwiched between the thin-film transistor layer and the color filter layer.

The color filter layer may have a transparent substrate on which the color filter elements are formed. Black masking structures may be formed on a transparent overcoat layer that covers the color filter elements. The black masking structures may have openings that are aligned with respective color filter elements. Black column spacers that extend from the color filter layer to the thin-film transistor layer through the liquid crystal layer may be formed from the same layer of material that forms the black masking structures.

DETAILED DESCRIPTION

Illustrative electronic devices of the types that may be provided with displays are shown in FIGS. 1, 2, 3, and 4.

Figure 1:
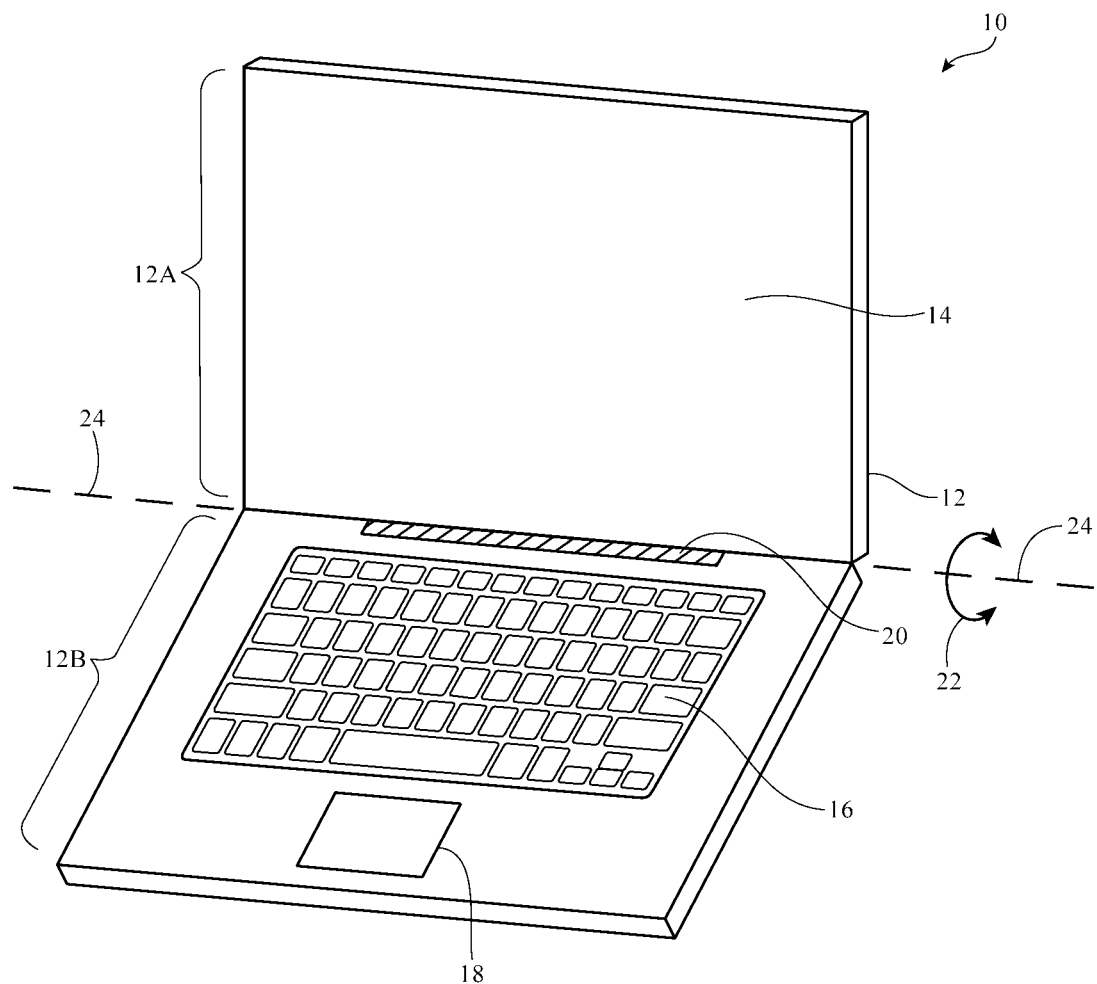
FIG. 1 is a perspective view of an illustrative electronic device such as a laptop computer with a display in accordance with an embodiment.

Electronic device 10 of FIG. 1 has the shape of a laptop computer and has upper housing 12A and lower housing 12B with components such as keyboard 16 and touchpad 18. Device 10 has hinge structures 20 (sometimes referred to as a clutch barrel) to allow upper housing 12A to rotate in directions 22 about rotational axis 24 relative to lower housing 12B. Display 14 is mounted in housing 12A. Upper housing 12A, which may sometimes be referred to as a display housing or lid, is placed in a closed position by rotating upper housing 12A towards lower housing 12B about rotational axis 24.

Figure 2:
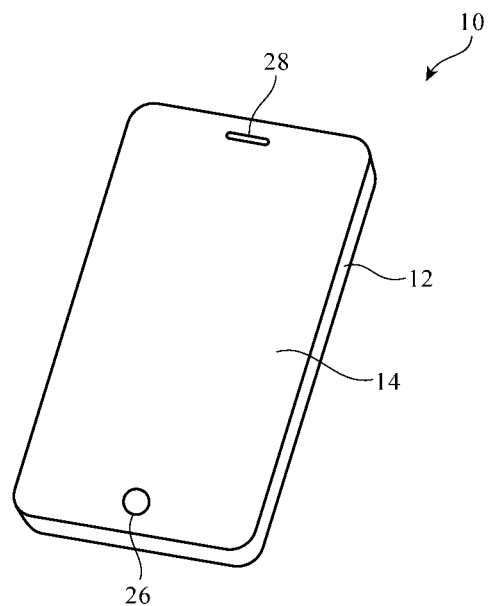
FIG. 2 is a perspective view of a portable electronic device such as a cellular telephone or other small portable device with a display in accordance with an embodiment.

FIG. 2 shows an illustrative configuration for electronic device 10 based on a handheld device such as a cellular telephone, music player, gaming device, navigation unit, or other compact device. In this type of configuration for device 10, housing, 12 has opposing front and rear surfaces. Display 14 is mounted on a front face of housing 12. Display 14 may have an exterior layer that includes openings for components such as button 26 and speaker port 28. Device 10 may, if desired, be a compact device such as a wrist-mounted device or pendant device (as examples).

Figure 3:
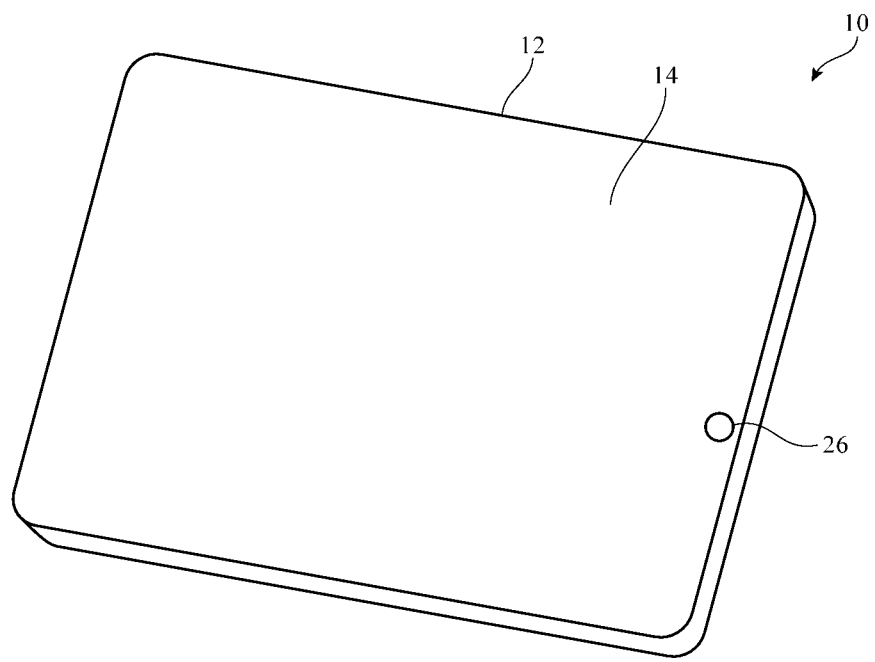
FIG. 3 is a perspective view of an illustrative tablet computer with a display in accordance with an embodiment.

In the example of FIG. 3, electronic device 10 is a tablet computer. In electronic device 10 of FIG. 3, housing 12 has opposing planar front and rear surfaces. Display 14 is mounted on the front surface of housing 12. As shown in FIG. 3, display 14 has an opening to accommodate button 26.

Figure 4:
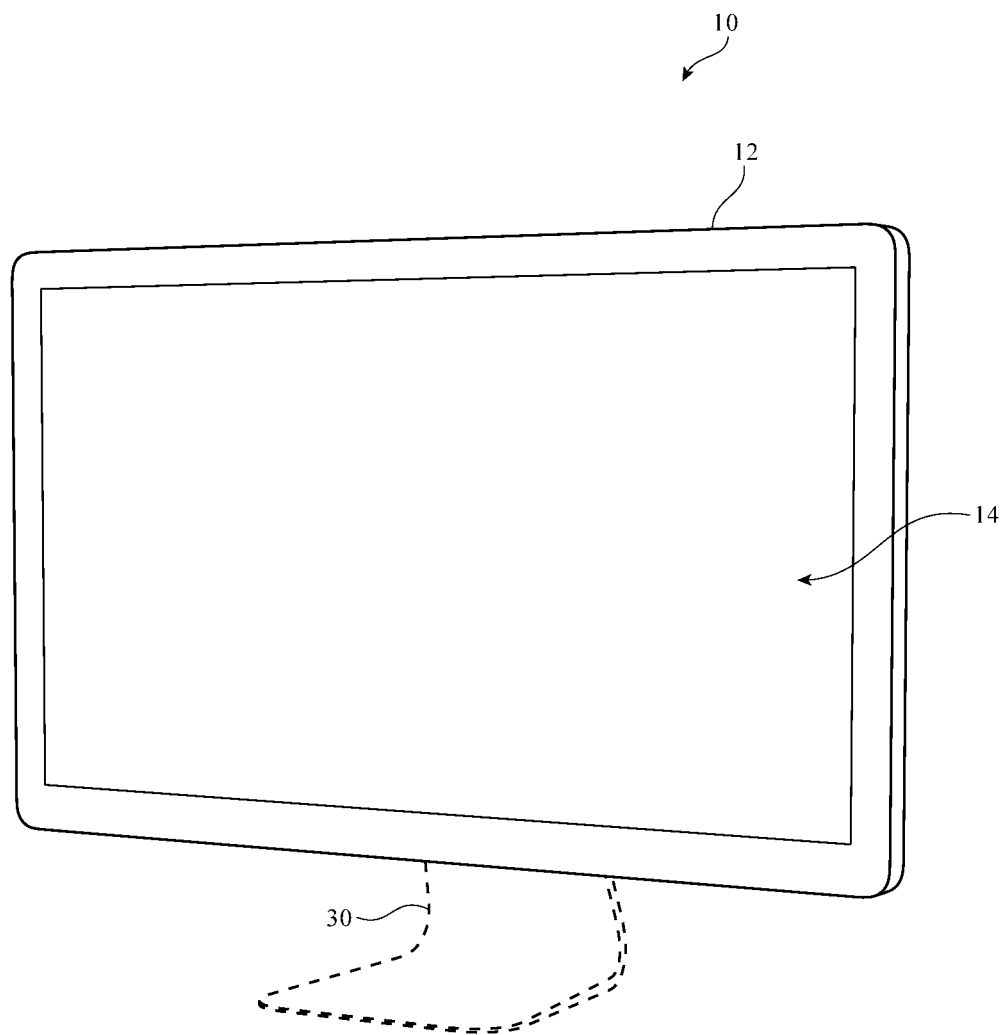
FIG. 4 is a perspective view of a display with an optional stand in accordance with an embodiment.

FIG. 4 shows an illustrative configuration for electronic device 10 in which device 10 is a computer display, a computer that has an integrated computer display, or a television. Display 14 is mounted on a front face of housing 12. With this is of arrangement, housing 12 for device 10 may be mounted on a wall or may have an optional structure such as support stand 30 to support device 10 on a flat surface such as a table or desk.

Figure 5:
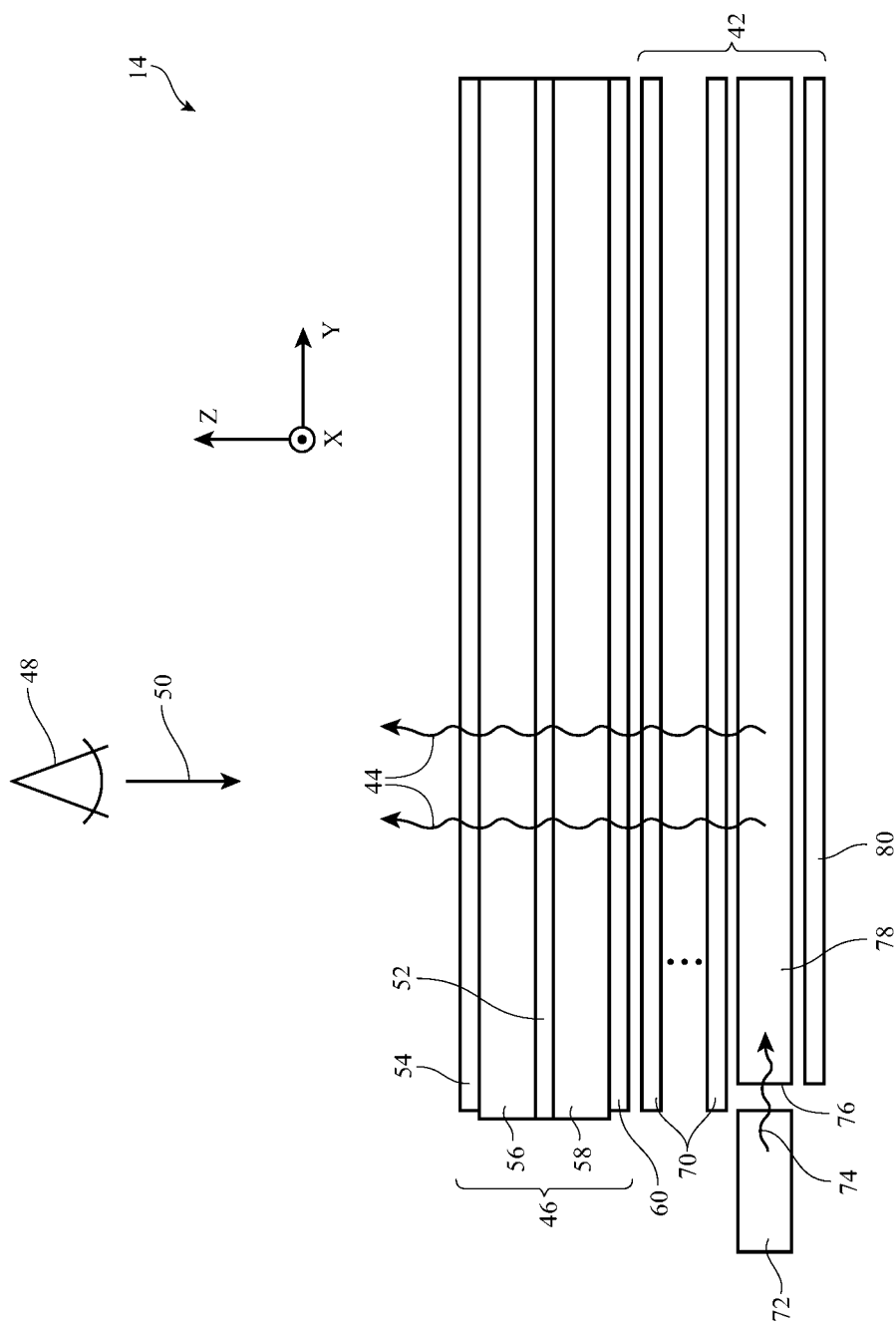
FIG. 5 is a cross-sectional side view of an illustrative display in accordance with an embodiment.

Display 14 may be a liquid crystal display or a display formed using other suitable display technologies. A cross-sectional side view of an illustrative configuration for display 14 of device 10 (e.g., a liquid crystal display for the devices of FIG. 1, FIG. 2, FIG. 3, FIG. 4 or other suitable electronic devices) is shown in FIG. 5. As shown in FIG. 5, display 14 may include backlight structures such as backlight unit 42, for producing backlight 44. During operation, backlight 44 travels outwards (vertically upwards in dimension Z in the orientation of FIG. 5) and passes through display pixel structures in display layers 46. This illuminates any images that are being produced by the display pixels for viewing by a user. For example, backlight 44 may illuminate images on display layers 46 that are being viewed by viewer 48 in direction 50.

Display layers 46 may be mounted in chassis structures such as a plastic chassis structure and/or a metal chassis structure to form a display module for mounting in housing 12 or display layers 46 may be mounted directly in housing 12 (e.g., by stacking display layers 46 into a recessed portion of housing 12).

Display layers 46 may include a liquid crystal layer such a liquid crystal layer 52. Liquid crystal layer 52 may be sandwiched between display layers such as display layers 58 and 56. Layers 56 and 58 may be interposed between lower (innermost) polarizer layer 60 and upper (outermost) polarizer layer 54.

Layers 58 and 56 may be formed from transparent substrate layers such as clear layers of glass or plastic. Layers 56 and 58 may be layers such as a thin-film transistor layer and/or a color filter layer. Conductive traces, color filter elements, transistors, and other circuits and structures may be formed on the substrates of layers 58 and 56 (e.g., to form a thin-film transistor layer and/or a color filter layer). Touch sensor electrodes may also be incorporated into layers such as layers 58 and 56 and/or touch sensor electrodes may be formed on other substrates.

With one illustrative configuration, outer substrate layer 56 may be a thin-film transistor layer that includes an array of thin-film transistors and associated electrodes (display pixel electrodes) for applying electric fields to liquid crystal layer 52 and thereby displaying images on display 14. Inner substrate layer 58 may be a color filter layer that includes an array of color filter elements for providing display 14 with the ability to display color images.

Backlight structures 42 may include a light guide plate such as light guide plate 78. Light guide plate 78 may be formed from a transparent material such as clear glass or plastic. During operation of backlight structures 42, a light source such as light source 72 may generate light 74. Light source 72 may be, for example, an array of light-emitting diodes.

Light 74 from light source 72 may be coupled into edge surface 76 of light guide plate 78 and may be distributed in dimensions X and Y throughout light guide plate 78 due to the principal of total internal reflection. Light guide plate 78 may include light-scattering features such as pits or bumps. The light-scattering features may be located on an upper surface and/or on an opposing lower surface of light guide plate 78.

Light 74 that scatters upwards in direction Z from light guide plate 78 may serve as backlight 44 for display 14. Light 74 that scatters downwards may be reflected back in the upwards direction by reflector 80. Reflector 80 may be formed from a reflective material such as a layer of white plastic or other shiny materials.

To enhance backlight performance for backlight structures 42, backlight structures 42 may include optical films 70. Optical films 70 may include diffuser layers for helping to homogenize backlight 44 and thereby reduce hotspots, compensation films for enhancing off-axis viewing, and brightness enhancement films (also sometimes referred to as turning films) for collimating backlight 44. Optical films 70 may overlap the other structures in backlight unit 42 such as light guide plate 78 and reflector 80. For example, if light guide plate 78 has a rectangular footprint in the X-Y plane of FIG. 5, optical films 70 and reflector 80 may have a matching rectangular footprint.

Display 14 may have an array of display pixels (e.g., a rectangular array having rows and columns) for displaying images to a viewer. Vertical signal lines called data lines may be used to carry display data to respective columns of display pixels. Horizontal signal lines called gate lines 206 may be used to carry gate line signals (sometimes referred to as gate control signals or gate signals) to respective rows of display pixels. The outline of the array of display pixels in display 14 defines an active area for display 14. The active area may have a rectangular shape and may be surrounded by an inactive border region. An inactive border area may, for example, run along one edge, two edges, three edges, or all four edges of the active area.

Figure 6:
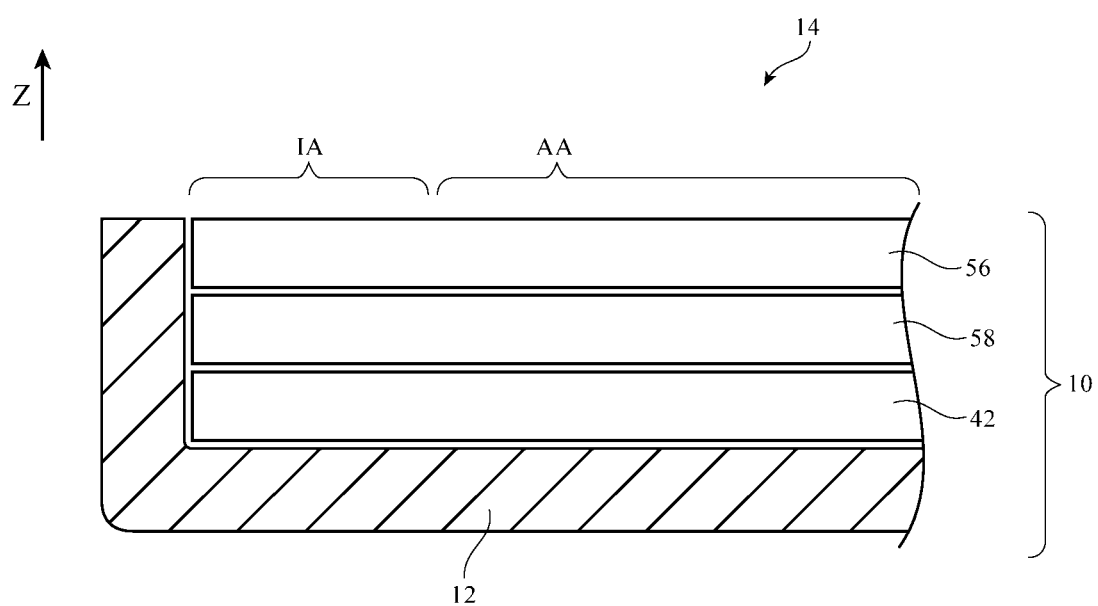
FIG. 6 is as cross-sectional side view of an edge portion of a display showing how the display may have inactive and active areas in accordance with an embodiment.

A cross-sectional side view of an illustrative electronic device having a display such as display 14 of FIG. 5 is shown in FIG. 6. As shown in FIG. 6, images may be displayed on central active area AA of display 14. Inactive area IA may have a rectangular ring shape that runs around the rectangular periphery of active area AA. To avoid unsightly bezel structures in device 10, it may be desirable to keep inactive area IA free of overlapping housing structures, bezels, or other potentially unattractive border structures.

Figure 7:
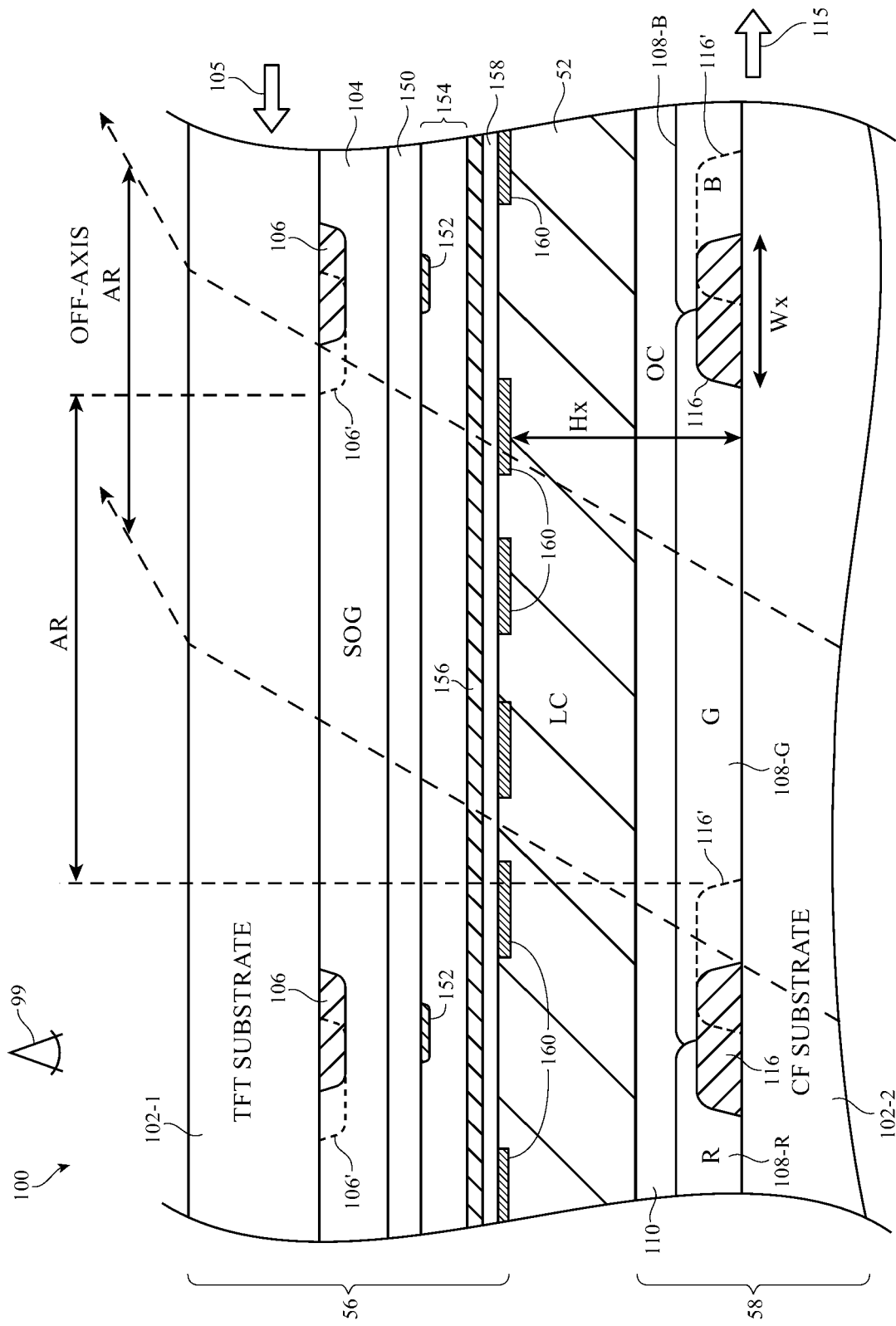
FIG. 7 is a cross-sectional side view of an illustrative display having a thin-film transistor layer on top of a color filter layer in accordance with an embodiment.

FIG. 7 shows a detailed cross-sectional side view of display 100 (e.g., a display of the type that may be used in implementing display 14 of FIGS. 1, 2, 3, and 4). Displays such as display 100 of FIG. 7 in which the thin-film transistor (TFT) layer 56 is closer to a user 99 viewing display 100 than the color filter (CF) layer 58 and in which color filter laser 58 is interposed between TFT laser 56 and backlight 42 are sometimes referred to as flipped panel displays.

As shown in FIG. 7, TFT layer 56 may include a TFT substrate 102-1 (e.g., a glass substrate layer), TFT black masking structures 106 formed on substrate 102-1, a planarization layer 104 (e.g., a spin-on glass layer, sometimes referred to herein as an SOG layer) formed on substrate 102-1 over black masking structures 106, a gate insulating (GI) layer 150 formed on planarization layer 104, conductive data line structures 152 formed on layer 150, dielectric layers 154 formed on layer 150 over the data line structures 152, a power supply layer 156 (e.g., a common voltage Vcom layer) formed over layers 154, an insulating layer 158 formed on Vcom layer 156, and pixel electrode structures 160 formed on insulating layer 158. Voltages applied on the pixel electrode structures 160 may control the liquid crystal (LC) material 52 that is sandwiched between TFT layer 56 and CF layer 58.

CF layer 58 may include a CF substrate 102-2 (e.g., a glass substrate layer), CF black masking structures 116 formed on substrate 102-2, color filter elements 108 (e.g., red color filter elements 108-R, green color filter elements 108-G, blue color filter elements 108-G, and other types of color filter elements) formed on substrate 102-2 corresponding to each respective display pixel, and a color filter array overcoat laser 110 formed over the color filter elements 108. Overcoat layer 110 may be formed form a clear polymer or other transparent materials.

During TFT-to-CF layer bonding operations, misalignment may cause the TFT structures to be laterally shifted in one direction (as indicated by arrow at 105) while causing the CF structures to be laterally shifted in an opposite direction as indicated by arrow 115). This can cause the TFT black masking structures 106 to shift to new position 106' while causing the CF black masking structures 116 to shift to new position 116'. This type of misalignment can undesirably reduce the display pixel aperture ratio (AR). Even without any lateral misalignment, the off-axis AR is limited by the width Wx of the CF black masking material 116.

It may be desirable to decrease the width Wx of CF black masking structure 116 to improve aperture ratio metrics. However, doing so would exacerbate color washout issues associated with adjacent display pixels. As shown in FIG. 7, the vertical distance between pixel electrode 160 and CF black masking structure 116 is defined by height Hx.

Figure 8:
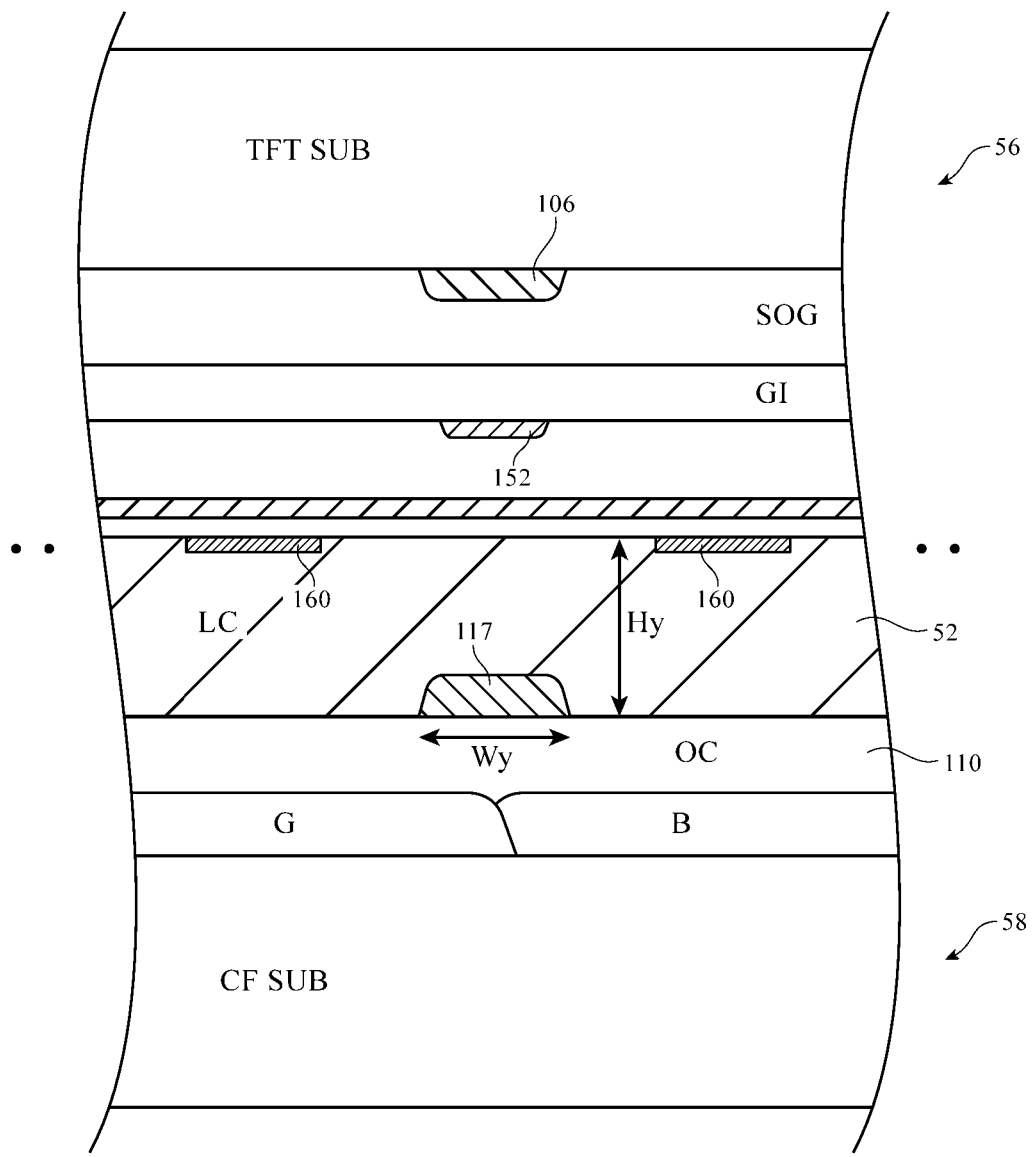
FIG. 8 is a cross-sectional side view of an illustrative display with black masking structures in accordance with an embodiment.

One way of improving reducing color washout is to reduce the vertical distance between pixel electrode 160 and CF black masking structure 116. FIG. 8 shows one suitable arrangement in which CF black masking structure 117 is formed on overcoat layer 110. Formed in this way, the distance between structures 160 and 117 is reduced (i.e., Hy is less than Hx), which allows the width Wy of CF black masking structure 117 to be reduced (i.e., Wy is less than Wx) while maintaining the same color washout margin. Reducing the width of CF black masking structure 117 in this way can therefore help improve the on axis and/or off-axis aperture ratio of display 100. Black masking structures 117 may surround respective color filter elements (e.g., black masking structures 117 may form a grid or other pattern with openings that are aligned with respective color filter elements to allow colored light from those elements to pass through the display). The black masking structures form borders for the pixels in the display and prevent undesired color mixing effects that might otherwise arise when light from adjacent pixels mixes due to inadequate separation between adjacent pixels.

Figure 9:
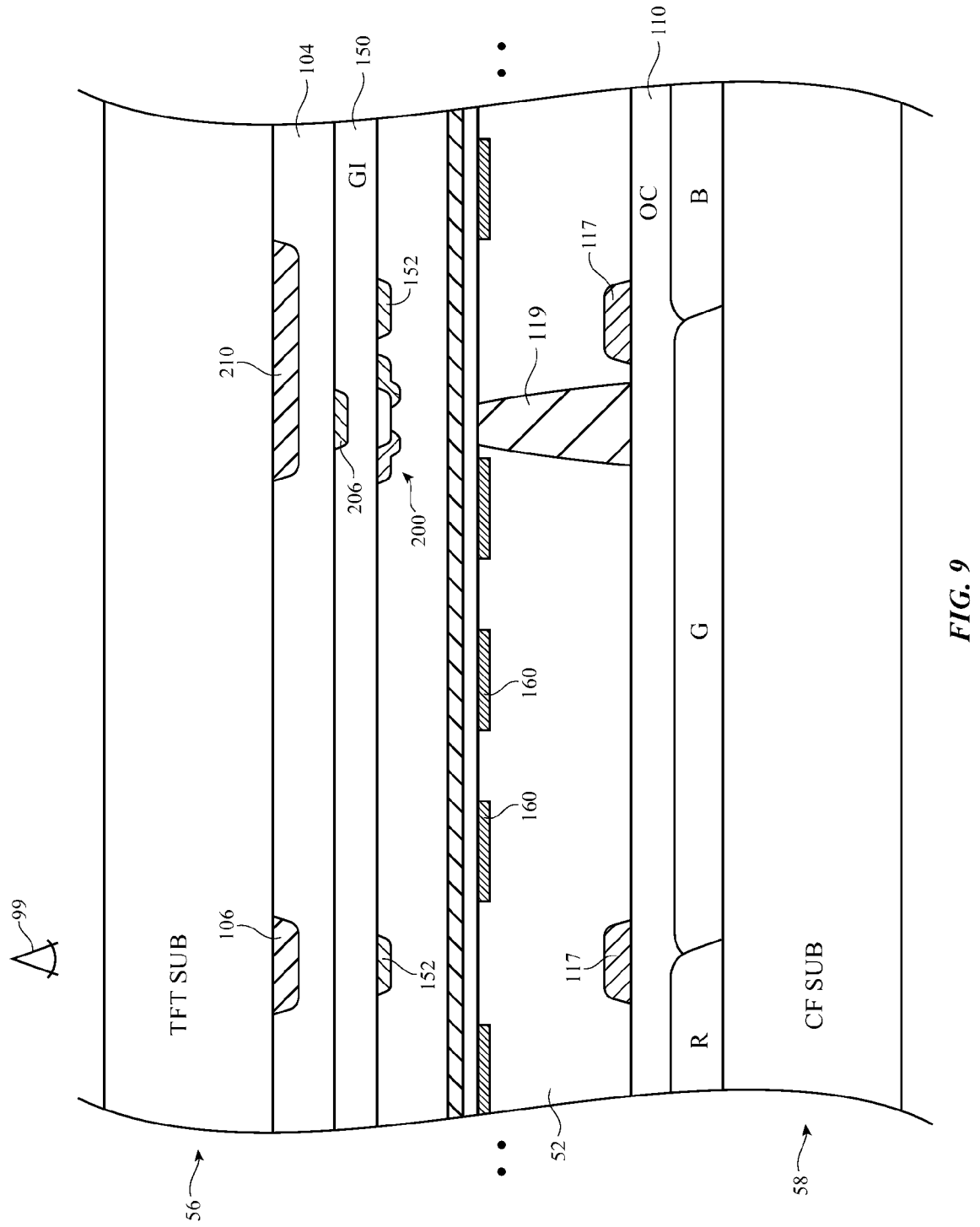
FIG. 9 is a cross-sectional side view of an illustrative display with black column spacers in accordance with an embodiment.

FIG. 9 shows another suitable arrangement in which column spacer structures such as column spacer structures 119 are formed at the same time as the CF black masking structures 117 (e.g., using a half-tone photolithographic mask). Column spacer structures 119 may also be formed using opaque material with the desired optical density and are therefore sometimes referred to as black column spacers (BCS). Spacers 117 and 119 may be formed from an opaque material such as black photoimageable polymer. Column spacer 119 may be firmed directly beneath a thin-film transistor such as transistor 200. Transistor 200 may serve as a gating switch that can be selectively turned on to pass desired voltages to corresponding pixel electrode structures 160. A TFT black masking structure 210 may be formed over column spacer structure 119 and an adjacent masking structure 117 lying directly beneath a corresponding data line 152. If desired, column spacer 119 may be formed using transparent material.

The foregoing is merely illustrative and various modifications can be made by those skilled in the art without departing from the scope and spirit of the described embodiments. The foregoing embodiments may be implemented individually or in any combination.

What is claimed is:

1. A display, comprising:
    a thin-film transistor layer, wherein the thin-film transistor layer comprises a transparent substrate on which a thin-film transistor and data lines are formed;
    a backlight;
    a color filter layer interposed between the backlight and the thin-film transistor layer;
    a layer of liquid crystal material interposed between the thin-film transistor layer and the color filter layer, wherein the color filter layer includes:
        an additional transparent substrate;
        color filter elements formed on the additional transparent substrate;
        a coating layer formed on the color filter elements; and
        black masking structures formed on the coating layer, wherein the black masking structures overlap the data lines; and
    a black column spacer formed on the coating layer adjacent to the black masking structures, wherein the black column spacer overlaps the thin-film transistor, wherein the thin-film transistor layer further comprises an additional black masking structure interposed between the thin-film transistor and the transparent substrate, and wherein the additional black masking structure overlaps the black column spacer and the thin-film transistor.

2. The display defined in claim 1 wherein the coating layer comprises a transparent overcoat layer having a lower surface adjacent to the color filter elements and having an opposing upper surface on which the black masking structures are formed.

3. The display defined in claim 2 wherein the black masking structures are formed from a black polymer layer and wherein a portion of the black polymer layer forms the black column spacer.

4. The display defined in claim 3 wherein the black column spacer extends from the color filter layer to the thin-film transistor layer through the layer of liquid crystal material.

5. The display defined in claim 1 wherein the additional black masking structure in the thin-film transistor layer that overlaps the black column spacer and the thin-film transistor also overlaps at least one of the data lines and the black masking structures in the color filter layer.

6. The display defined in claim 5 further comprising at least one transparent layer within the thin-film transistor layer that is interposed between the additional black masking structure in the thin-film transistor layer and the liquid crystal layer.

7. The display defined in claim 6 wherein the at least one transparent layer comprises a gate insulator layer.

8. The display defined in claim 7 further comprising a planarization layer between the additional black masking structure in the thin-film transistor layer and the gate insulator layer.

9. The display defined in claim 8 wherein the color filter elements include red color filter elements, blue color filter elements, and green color filter elements.

10. The display defined in claim 9 further comprising first and second polarizers, wherein the thin-film transistor layer, the liquid crystal layer, and the color filter layer are interposed between the first and second polarizers.

11. A display, comprising:
    a thin-film transistor layer having a data line and a black masking structure that overlaps the data line;
    a color filter layer;
    a layer of liquid crystal material interposed between the thin-film transistor layer and the color filter layer, wherein the color filter layer includes color filter elements covered with a transparent overcoat layer and a grid of black masking material on the transparent overcoat layer; and
    a black column spacer on the transparent overcoat layer in an opening in the grid, wherein the black masking structure in the thin-film transistor layer overlaps the black masking material in the color-filter layer and the black column spacer.

12. The display defined in claim 11 further comprising: a backlight, wherein the color filter layer is interposed between the thin-film transistor layer and the backlight.

13. The display defined in claim 12 wherein the color filter layer comprises a transparent substrate on which the color filter elements are formed and wherein the color filter elements include red, green, and blue color filter elements.

14. The display defined in claim 13 wherein the grid of black masking material has a plurality of openings that are aligned with respective color filter elements among the color filter elements on the transparent substrate.

15. The display defined in claim 14, wherein the grid of black masking material overlaps borders between the red, green, and blue color filter elements.

* * * * *